United States Patent
Nobelen et al.

(10) Patent No.: US 9,415,877 B2
(45) Date of Patent: Aug. 16, 2016

(54) METHOD OF SYNCHRONIZING THE ENGINES OF AN AIRCRAFT

(71) Applicant: SNECMA, Paris (FR)

(72) Inventors: Florent Nobelen, Paris (FR); Cedrik Djelassi, Marolles en Hurepoix (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/200,130

(22) Filed: Mar. 7, 2014

(65) Prior Publication Data

US 2014/0257667 A1  Sep. 11, 2014

Related U.S. Application Data

(63) Continuation-in-part of application No. PCT/FR2012/051968, filed on Sep. 3, 2012.

(30) Foreign Application Priority Data

Sep. 9, 2011 (FR) ...................................... 11 58051

(51) Int. Cl.
*B64D 31/12* (2006.01)
*F02C 9/42* (2006.01)

(52) U.S. Cl.
CPC .. *B64D 31/12* (2013.01); *F02C 9/42* (2013.01)

(58) Field of Classification Search
CPC ........ B64D 31/00; B64D 31/02; B64D 31/04; B64D 31/06; B64D 31/08; B64D 31/10; B64D 31/12; B64D 31/14; B64D 2033/0266; B64D 2033/0273; B64D 2033/028; B64D 2033/0286; B64D 2033/0293; F02D 25/02
See application file for complete search history.

(56) References Cited

U.S. PATENT DOCUMENTS 5,224,340 A  7/1993  Snow

FOREIGN PATENT DOCUMENTS

| EP | 0 025 406 A1 | 3/1981 |
| EP | 0 322 342 A2 | 6/1989 |
| GB | 2 225 134 A | 5/1990 |

OTHER PUBLICATIONS

International Search Report mailed Dec. 18, 2012 for PCT/FR2012/051968 filed on Sep. 3, 2012 with English Translation.
International Written Opinion mailed Dec. 18, 2012 for PCT/FR2012/051968 filed on Sep. 3, 2012.

*Primary Examiner* — Jerrah Edwards
(74) *Attorney, Agent, or Firm* — Oblon, McClelland, Maier & Neustadt, L.L.P.

(57) ABSTRACT

A method of synchronizing engines of an airplane in accordance with at least one activation logic (10, 10') defining a deactivated state (20), a primed state (22), and at least one activated state (16, 18), and comprising:
  passing (32) synchronization from the deactivated state to the primed state when a pilot of the airplane issues an activation order;
  passing (36) synchronization from the primed state to the activated state when at least certain safety and/or activation conditions are satisfied; and
  passing (24, 34) synchronization from the activated or primed state to the deactivated state when the pilot issues a deactivation order or whenever at least some of the safety conditions are not satisfied.

16 Claims, 3 Drawing Sheets

METHOD OF SYNCHRONIZING THE ENGINES OF AN AIRCRAFT

The present invention relates to a method of synchronizing the engines of an airplane, and in particular two-spool turbojets of an airplane.

A small difference in the speeds of rotation of the engines of an airplane can give rise to undesirable vibration and acoustic noise. It is known to synchronize the low pressure (LP) spools or the high pressure (HP) spools of two-spool engines of an airplane in order to reduce the vibration felt in the cabin and also to reduce noise, thereby increasing passenger comfort.

Nevertheless, this synchronization function is only for satisfying comfort requirements and it must not give rise to risks for the engines or the airplane. Engine synchronization is therefore deactivated if safety conditions are not satisfied, even if the pilot issues a request to activate synchronization and the conditions for activating synchronization are all satisfied. By way of example, these safety conditions represent limit values that must not be reached in order to allow synchronization to be activated and maintained. By way of example, these values are minimum and maximum speeds for the rotor of the HP spool in each engine (N2min, N2max), a maximum static pressure in the combustion chamber of each engine (Ps3max), and bottom and top limit values (risk of losing thrust, risk of surging) for the dimensioning ratio Q of each engine (Q=fuel flow rate÷Ps3max).

Nevertheless, the safety conditions cannot all be verified each time the pilot issues a request to activate synchronization since that would be detrimental to the efficiency of the engine, which is why synchronization is activated not solely on a simple request from the pilot, and requires additional conditions to be verified.

Document FR-A1-2 639 444 describes a method of synchronizing an engine that is slaved to a master engine in an airplane, the engines being two-spool turbojets, each having a fan rotor and a gas generator rotor. The speed of rotation of the fan or the rotor of the low pressure spool of the slave engine (written N1) and the speed of rotation of the gas generator or the rotor of the high pressure spool of the slave engine (written N2) may be controlled by regulating the rate at which fuel is fed to the engine, by modifying the angular pitch of the stator vanes of the engine, etc.

In that document, synchronization is activated when the difference (ΔN1) between the above-mentioned speeds of the fans of the two engines becomes less than 100 revolutions per minute (rpm) and it is deactivated when that difference exceeds said value, or when one of the engines stops or stalls, or when one of the signals N1 is not detected, or when the ratio PLA/N2 of the slave engine exceeds a certain limit (where PLA stands for power level angle, i.e. the position of the throttle control in the cockpit). The airplane pilot is informed that synchronization has been deactivated. Synchronization is reactivated automatically when the difference ΔN1 drops below the 100 rpm bar. That method is entirely automatic and does not require any specific order from the airplane pilot.

That type of synchronization presents the drawback of being entirely automatic. Engine synchronization is reactivated when all of the conditions are satisfied once again, without any specific request from the airplane pilot. Nevertheless, it can happen that such conditions present a risk for the engines or for the airplane (e.g. a risk of the engines surging or being subjected to overspeeds) thus making it dangerous for engine synchronization to be reactivated automatically. Furthermore, when these conditions present no risk for the engines or the airplane (e.g. in the event of the engines being in a transient speed state), it does not appear desirable to request confirmation from the pilot before reactivating synchronization since that could lead to the pilot being distracted and not paying proper attention to possible numerous changes in the results of these conditions (fuel sloshing true/false).

In addition, when synchronization is activated automatically, the value of the setpoint for the speed N1 (or N2) of the slave engine becomes aligned on the value of the speed of the master engine and thus departs from its original setpoint that was calculated for delivering the required thrust in optimum manner. By synchronizing speeds, the thrust from this engine is no longer optimum: it is either increased, thereby reducing the lifetime of the engine, or else decreased, thereby obliging the pilot to move the throttle lever, which likewise reduces engine lifetime. That is a major drawback for activation logic that is fully automatic: the performance of an engine is degraded for synchronization purposes, even when that is not necessary, e.g. when vibration remains at an acceptable level, and it is only the pilot who can assess such a situation. It is therefore appropriate to include a pilot order in the activation of synchronization, even though that can lead to problems under certain circumstances, as mentioned above.

A particular object of the invention is to provide a solution to these problems of the prior art that is simple, effective, and inexpensive.

The invention provides a synchronization method in which the logic(s) for activating synchronization enables synchronization to be reactivated automatically when that presents no risk for the engines or the airplane, while requiring confirmation by the pilot when, on the contrary, there might exist a risk for the engines or the airplane.

To this end, the invention provides a method of synchronizing airplane engines by means of at least one activation logic for verifying safety conditions for activating synchronization and for verifying synchronization activation conditions, the method being characterized in that the activation logic defines synchronization states comprising at least a deactivated state, a primed state, and an activated state, and in that it comprises:

passing synchronization from the deactivated state to the primed state when a pilot of the airplane gives an activation order;

passing synchronization from the primed state to the activated state when certain safety and/or activation conditions are satisfied; and passing synchronization from the activated state or the primed state to the deactivated state when a deactivation order is given by the pilot or whenever safety conditions are not satisfied.

The activation logic of the method of the invention thus includes at least one synchronization activation state that is additional compared with that which is provided in the prior art, in which synchronization is either deactivated (OFF mode) or activated (ON mode), the synchronization of the invention being capable of adopting at least one primed state in OFF mode, in addition to the deactivated state.

The conditions for reactivating synchronization also differ as a function of the synchronization state in OFF mode.

When synchronization is in the deactivated state, an activation order must be issued by the pilot to cause synchronization to pass to the primed state. When at least some safety and/or activation conditions are satisfied, synchronization then passes from the primed state to the activated state.

The safety conditions are different from the activation conditions and they must be satisfied in order to protect the engines and the airplane. By way of example, these safety conditions comprise: no surging of the engines, no overspeed of the engines, no over- or under-thrust from the engines, no major breakdown of the engines, etc. By way of example, these conditions make it possible to avoid a healthy engine following the behavior of a failing engine.

The conditions for activating synchronization must be satisfied in order to optimize the operation of the engines, since synchronization is not appropriate for all operating speed states and it may differ depending on the (HP or LP) type of the speed state of the engines that is being synchronized. By way of example, activation conditions comprise a difference in the speed setpoints for the LP and/or HP spools of the engines being less than about 10%, preferably less than 5%, and more preferably less than 2%; a difference between the speeds of the LP and/or HP spools of the engines being less than about 10%, preferably less than 5%, and more preferably less than 2%; and a difference between the setpoint and the measured speed of the LP and/or HP spool of the engine less than about 10%, preferably less than 5%, and more preferably less than 2%; for a speed state corresponding to cruising, to a transient, to idling, or to any speed state other than takeoff and landing.

When synchronization is in the primed or activated state, the pilot may issue a deactivation order. The passage from the activated or primed state to the deactivated state is nevertheless automatic in the event of at least some of the safety conditions not being satisfied.

The synchronization method of the invention thus has two types of activation or reactivation, namely automatic reactivation and reactivation ordered by the airplane pilot. Automatic reactivation is performed when only the activation conditions have changed (the safety conditions still being satisfied), and reactivation needs to be confirmed by the pilot whenever the safety conditions have changed (whatever the result of verifying the activation conditions).

In practice, at least one synchronization activation button is installed in the cockpit, and in particular two buttons are installed when the engines are of the two-spool type (HP and LP spools). The first button is for activating synchronization of the LP spools of the engines (N1Sync), and the second button is for activating synchronization of the HP spools of the engines (N2Sync). Each button can adopt two positions, an ON position (e.g. depressed and lighted) and an OFF position (extended and not lighted). The pilot cannot request synchronization of both spools simultaneously. If the pilot presses the first button in order to cause it to be depressed while the second button is already in the depressed position, then the second button disengages automatically in order to return to the extended position.

The airplane pilot then needs to press on one of the buttons in order to request activation of synchronization, which then passes from the deactivated state to the primed state. As explained above, synchronization passes from the primed state to the activated state when at least certain safety and/or activation conditions are satisfied. In the event of the pilot pressing once more on the button in order to cancel the order, synchronization passes to the deactivated state. Synchronization also passes to the deactivated state whenever at least some of the safety conditions are not satisfied. Under such circumstances, synchronization is in the deactivated state even though the cockpit button might still be depressed and lighted. The pilot then needs to press the button twice; firstly in order to return it to its extended position, and secondly in order to push it back once more into the depressed position so as to cause synchronization to pass to the primed state. An order from the pilot is necessary under such circumstances for repriming synchronization.

The invention makes it possible to optimize the availability of the synchronization function and to optimize the performance of the engines, by distinguishing between the situation in which synchronization can be reactivated automatically without risk and the situation in which it is necessary to have an order from the pilot for the purpose of performing such reactivation.

By way of example, the means for performing the method of the invention may comprise an electronic chip having at least one of the activation logics encoded thereon, logic gates (AND, OR, NOT, etc.), and means for summing, comparing, detecting fronts, conditions, etc.

The conditions for applying and maintaining synchronization may be verified at regular intervals, e.g. once every 30 milliseconds (ms).

The activation logic preferably includes passing from the activated state to the primed state whenever at least some activation conditions are no longer satisfied. This applies for example when synchronization is no longer appropriate because the airplane is in a state of takeoff or landing and is therefore not cruising.

According to another characteristic of the method of the invention, the activation logic defines two distinct activated states, comprising a guaranteed activated state and a non-guaranteed or test activated state (or "synchro attempt" state). The activation logic then has four activation states, two in ON mode (guaranteed activated state and non-guaranteed activated state) and two in OFF mode (deactivated state and primed state).

The activation logic may include passing synchronization from the primed state to the non-guaranteed activated state if only a predefined portion of the activation conditions are satisfied, and to the guaranteed activated state if all of the activation conditions are satisfied. Synchronization may pass from the non-guaranteed activated state to the guaranteed activated state, or vice versa, as a function of changes occurring in the results of verifying activation conditions.

When synchronization is in the non-guaranteed activated state, it is not deactivated. The difference compared with the guaranteed activated state may concern the display in the cockpit, for informing the pilot that the operation of synchronization is not guaranteed in this state, e.g. corresponding to a transient state or an idling speed state. Nevertheless, and as described below, the engines may have speed states that are very similar, as though they were truly synchronized. There is then no advantage in deactivating synchronization. If all of the activation conditions are satisfied, synchronization will pass back to the activated state.

When the engines are of the two-spool type, each comprising a low pressure (LP) spool and a high pressure (HP) spool, synchronization of the LP spools of the engines is advantageously activated in accordance with a first activation logic and synchronization of the HP spools of the engines is activated in accordance with a second activation logic. The conditions for activating synchronization of the LP spools are different from those for synchronizing the HP spools, the logic for activating synchronization of the HP spools may differ from that for the LP spools, in particular in that the synchronization of the HP spools may be maintained in a transient speed state (so long as the difference ΔN2 between the speeds remains low).

The conditions for applying synchronization to the LP and/or HP spools may for example comprise one or more of the following conditions:

A1: the difference between the setpoints for the speeds of the LP or HP rotors of the engines is less than 10%;

A2: no fault has been detected that might affect the health of the engines or that might generate risks for the airplane;

A3: the difference between the measured speeds of the LP or HP rotors of the engines is less than 10%;

A': the difference between the speed setpoint and the measured speed for each LP or HP rotor is less than 10%;

B: at least one of the engines is idling; and

C: the airplane is in flight and is neither in a takeoff stage nor in a climbing stage.

Synchronization may pass from the activated state to the deactivated state when the conditions A1, A2 and possibly A3 (for HP synchronization) are not satisfied. Synchronization may be caused to pass from the activated state to the primed state when the conditions C are not satisfied.

The present invention also provides rising front logic on pilot order that makes it possible to avoid priming synchronization if it has been deactivated and the above-mentioned cockpit button has remained depressed.

Independently of the existence of the above-mentioned guaranteed and non-guaranteed activated states, when at least two engines are concerned, it may also be desirable for an engine not to declare itself activated on its own, since that might affect the synchronization of the engines, or even their proper operation.

In order to avoid this situation, it is proposed that, for each engine:
  the passing of synchronization from the primed state to the activated state is performed by means of a transient ready-to-activate state;
  synchronization is passed from the activated state to the ready-to-activate state when certain safety and/or activation conditions are satisfied;
  before any passing of synchronization from the ready-to-activate state to the activated state, account is taken for each engine of the activated or ready-to-activate state and this data is exchanged between the engines; and
  synchronization is passed from the ready-to-activate state to the activated state on one of the engines, if the other engine or engines is, or are, in the ready-to-activate state or in the activated state.

If both the guaranteed activated state and the non-guaranteed activated state are in existence, then, in order to ensure that one of the engines is not the only engine in the activated state (whether or not guaranteed) without the other(s) being in the activated state, it is recommended that the activation logic defines an additional state, which is a ready-to-activate state that is transient, and distinct from said deactivated, primed, non-guaranteed activated, and guaranteed activated states respectively, said ready-to-activate state taking account of the state of one of the engines relative to the other(s) depending on whether or it is in the guaranteed activated state, such that:
  if one of the engines passes to the activated state, the other engine(s) also pass(es) to the activated state automatically; and
  passing the synchronization of one of the engines to the guaranteed activated state requires all of the safety and activation conditions of the other engine(s) to be satisfied.

The invention can be better understood and other characteristics, details, and advantages thereof appear more clearly on reading the following description made by way of non-limiting example and with reference to the accompanying drawings, in which.

Figure 1:
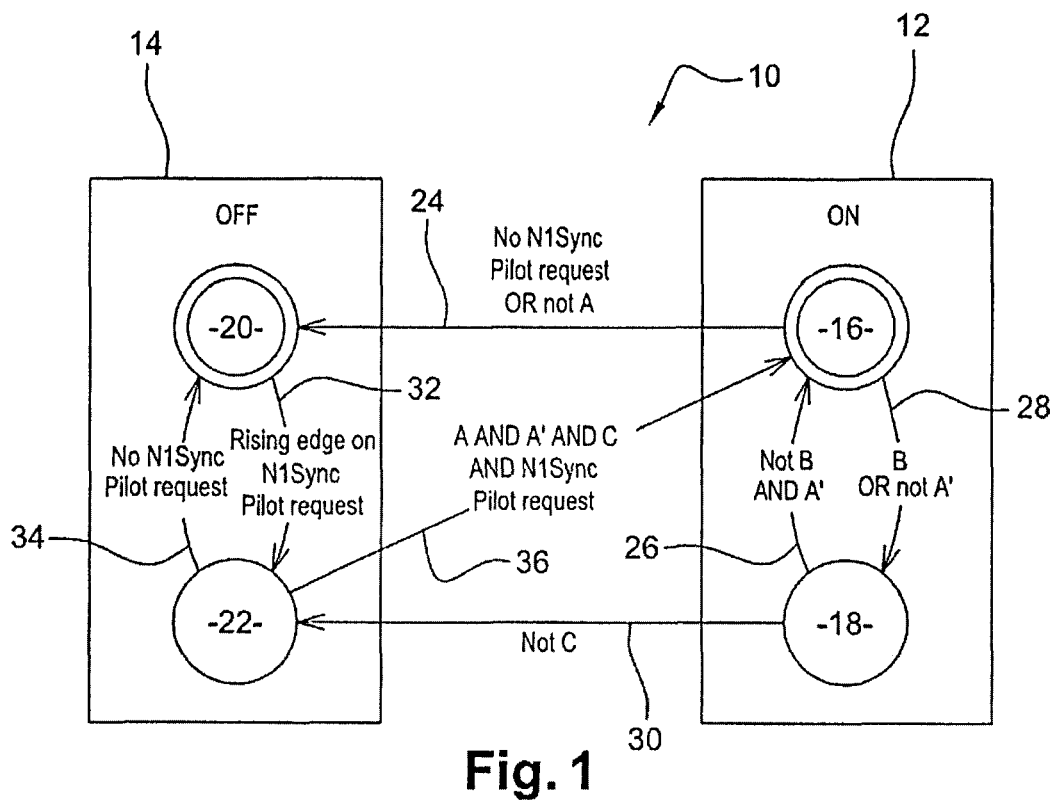
FIG. 1 is a diagram showing activation logic of the invention for synchronizing the rotors of low pressure spools in the engines of an airplane.
Figure 3:
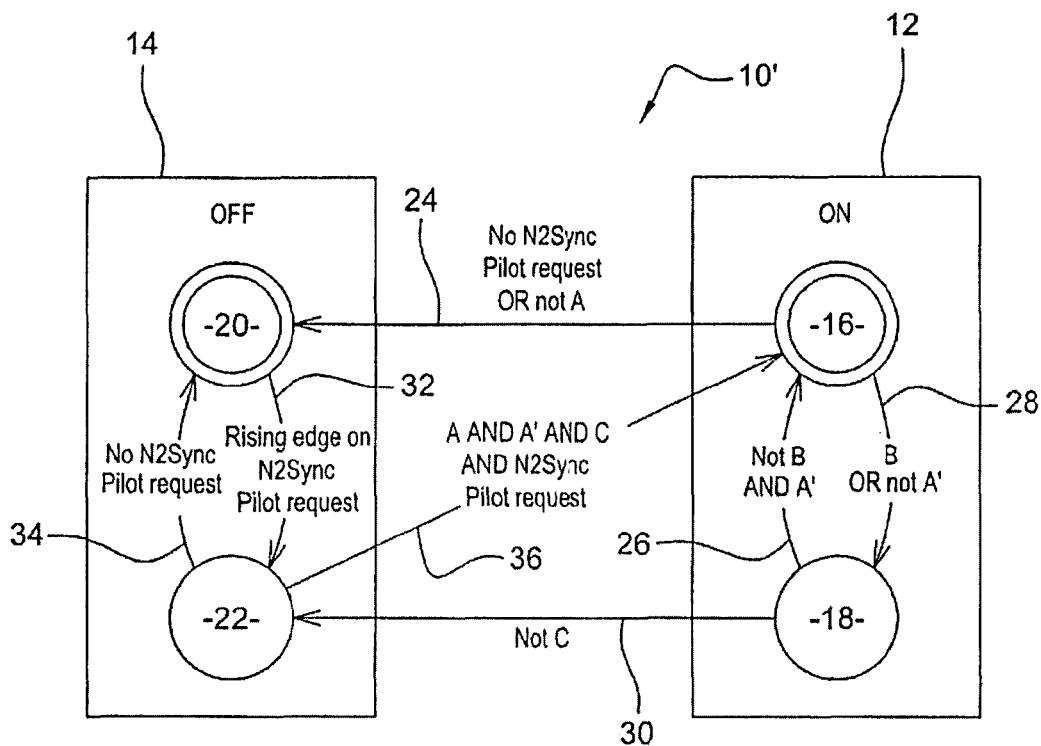
FIG. 3 is a diagram showing activation logic of the invention for synchronizing the rotors of high pressure spools of the engines of an airplane.

The diagrams of FIGS. 1 and 3 represent activation logic 10, 10' in accordance with the present invention for synchronizing the engines of an airplane, and in particular two-spool engines such as turbojets or turboprops. The diagram of FIG. 1 represents the activation logic 10 for synchronizing the rotors of low pressure (LP) spools of the engines, while the diagram of FIG. 3 represents the activation logic 10' for synchronizing the rotors of the high pressure (HP) spools of the engines.

In both circumstances 10, 10', the synchronization may be in an ON mode (represented by the rectangle 12) or in an OFF mode (represented by the rectangle 14). In the example shown, the activation logic 10, 10' defines four synchronization activation states: two ON mode states (guaranteed activated state 16 and non-guaranteed activated state 18) and two OFF mode states (deactivated state 20 and primed state 22).

The arrows 24 to 40 show possible changes of state from one synchronization state to another synchronization state, some of these changes being automatic once conditions for applying synchronization change, while other changes require the pilot of the airplane to issue an activation order or a deactivation order.

There are two types of condition for applying synchronization: safety conditions for protecting the engines and the airplane; and activation conditions for optimizing the operation of the engines.

In the implementation shown in the drawings, the activation logic 10, 10' has four conditions labeled respectively A, A', B, and C. The conditions A, A', B, and C of the activation logic 10 for synchronizing the LP spools are not all identical to the conditions of the activation logic 10' for synchronizing the HP spools.

For synchronizing the LP spools (FIG. 1), the conditions A comprise an activation condition A1 and a safety condition A2. The activation condition A1 is:

$$|\Delta N1 dmd\_PWM| < 5\%$$

meaning that the difference between the speed setpoints N1 for the LP rotors of the engines (in absolute value) must be less than 5%. $\Delta N1$ represents the difference between the speeds of the LP rotors, "dmd" means that it is the demand or setpoint value for each engine that is taken into account, and "PWM" means that this setpoint value is specific to each engine and is calculated by a power management function in a computer of each engine (this function calculates the N1 setpoints as a function of the position of the throttle lever and of other parameters). If the engines have LP speeds that differ by too much (A1>5%, e.g. because the engine throttle levers in the cockpit are in different positions, or because the setpoints are too different as a result of the difference between the speeds N1 of the engines being too great for the engines to produce the same thrust), then the condition A1 is not satisfied. It is thus the difference between these two original setpoints that is monitored. Synchronization can thus be deactivated if the throttle levers of the engines are in different positions (if they are spaced apart from each other).

The activation condition A2 is the absence of detecting any fault that might damage the engines or that might lead to risks for the engines or the airplane and the passengers. Since synchronization is a comfort function, no risk is taken and it is deactivated in the presence of an unwanted engine event (surging, overspeed, under- or over-thrust, etc.) or breakdown, in particular to avoid the healthy engine starting to behave like the failed engine.

The conditions A1 and A2 are cumulative and both of them must be satisfied for the conditions A to be considered as being satisfied.

As indicated by arrow 24, these conditions A must necessarily be satisfied in order to activate synchronization, i.e. in order for synchronization to be in ON mode. In the event of these conditions A not being satisfied (or whenever the conditions "not A" are satisfied), synchronization is automatically deactivated and it passes from ON mode (whether in the guaranteed activated state 16 or in the non-guaranteed activated state 18) to OFF mode (deactivated state 20). These conditions A, comprising both an activation condition A1 and a safety condition A2 are thus necessary for activating synchronization, and this applies regardless of the orders issued by the pilot. Safety thus has precedence over the comfort obtained by synchronizing the engines of the airplane.

As mentioned above, the conditions A comprise two cumulative conditions A1 and A2. In the event of either of them not being satisfied, synchronization is deactivated, regardless of whether it was in the guaranteed activated state or in the non-guaranteed activated state. If there is an engine event or a breakdown, the pilot must respond and decide whether it is desirable to reactivate synchronization once the breakdown has been corrected. When there is a difference between setpoints, this originates a priori from the pilot and it is thus up to the pilot to decide when to reactivate synchronization.

As indicated on arrow 24, the change from the activated state (whether non-guaranteed 18 or guaranteed 16) to the deactivated state 20 can also result from the pilot of the airplane issuing an order specifically to deactivate synchronization ("No N1Sync Pilot request"). The conditions "not A" and "No N1Sync Pilot request" are not cumulative because of the OR term. It thus suffices for one or the other of these conditions to be satisfied to cause synchronization to be deactivated.

The activation conditions A' comprise two activation conditions A'1 and A'2, which are respectively:

$$|N1dmd\_ctrl1 - N1sel1| < 5\%$$

and $$|N1dmd\_ctrl2 - N1sel2| < 5\%$$

whereby the difference between the setpoint and the measured value ("sel" for selected) of the speed N1 of each LP rotor (in absolute value) must be less than 5%. "ctrl" means that it is the current control setpoint that is taken into account, i.e. the common averaged setpoint if the engines are synchronized. These conditions are satisfied when both engines are running at stabilized speed and are therefore not in a transient speed state. In contrast, the conditions "not A'" are satisfied when at least one of the engines is in a transient speed state.

These conditions A' must necessarily be satisfied in order to activate synchronization. Nevertheless, when they are not satisfied, synchronization is not necessarily deactivated, as explained below.

The activation conditions B are satisfied if at least one of the engines is idling. These conditions are useful for changing from the guaranteed activated state to the non-guaranteed activated state, and vice versa, when the airplane is being controlled by an idling loop and the throttle lever is in the idling position.

As indicated by arrow 26, synchronization changes from the non-guaranteed activated state 18 to the guaranteed activated state 16 if the above-mentioned conditions A' are satisfied and the conditions B are not satisfied (or the conditions "not B" are satisfied). Synchronization changes from the guaranteed activated state 16 to the non-guaranteed activated state 18 if one or the other of these conditions B is satisfied and the conditions A' are not satisfied (or conversely the conditions "not A'" are satisfied—arrow 28).

In other words, synchronization goes from the non-guaranteed activated state 18 to the guaranteed activated state 16 if the engines are not idling and if the difference between the setpoint values and the measured values of the speed N1 in each engine is less than 5%.

By way of example, while the engines are in a transient speed state, the conditions A' are not satisfied. Synchronization changes of the non-guaranteed activated state since there is no point in deactivating synchronization given that control is no longer being applied via the speeds N1. The fact that the setpoint for the speed N1 is the setpoint specific to each engine or else is the common setpoint for synchronization is of little importance. When the conditions A' are satisfied once more, at the end of the transient speed state, then synchronization changes back automatically to the guaranteed activated state.

Figure 2:
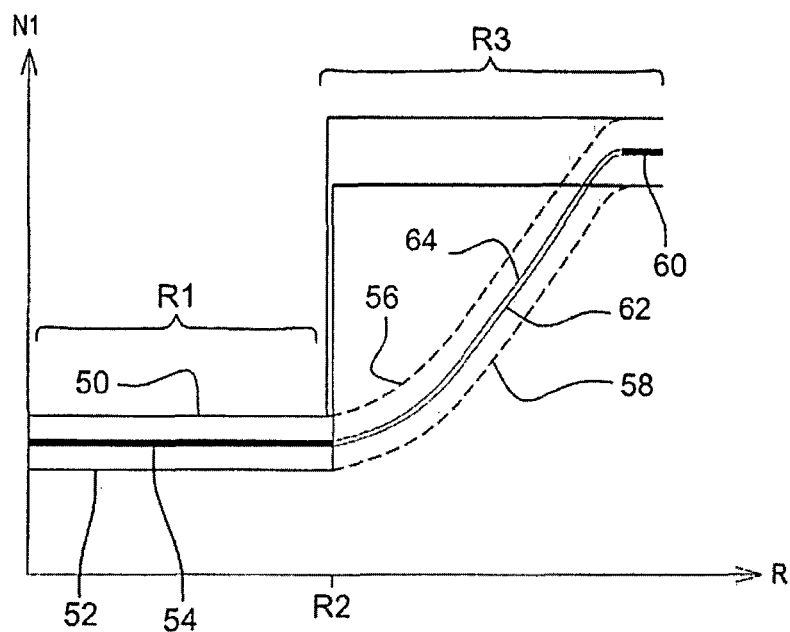
FIG. 2 is a very diagrammatic graph showing how the synchronization setpoints for the LP rotors of the engines of an airplane vary as a function of the speed of the engines.

FIG. 2 shows how the speed N1 of the LP rotors of the engines of an airplane varies when there is a change in the speeds of the engines.

In the example shown, the airplane has only two engines and the graph of FIG. 2 has two curves 50 and 52 representing the speed setpoints N1 specific to each engine, i.e. the setpoints that result from the positions of the throttle levers as determined by the pilot of the airplane. The curves 50 and 52 present a stepped shape, each having a horizontal first portion representing a constant setpoint N1 since the speed state R1 of the engine is stable, a cylindrical portion representing a change in the setpoint N1 since the speed state R2 is transient, and a new horizontal portion representing a setpoint N1 that is constant since the speed state R3 is stable again.

The change from the stable speed state R1 to the transient speed state R2 is due to the pilot of the airplane moving the throttle levers. As can be seen in FIG. 2, the setpoints N1 specific to each of the engines are slightly different in order to obtain the same thrust, even if the throttle levers of the engines are in the same positions. It can be found that the two engines of a given airplane may present slightly different revolutions per minute (rpm) in order to produce the same thrust.

The setpoint N1 for synchronizing the LP rotors is equal to the average of the setpoints N1 specific to each of the engines. The speeds N1 of the engines thus adopt this setpoint which is represented diagrammatically by the bold continuous line 54 in FIG. 2, which lies between the curves 50 and 52 in the above-mentioned first horizontal portions of these curves.

When the conditions A' are no longer satisfied, i.e. when the engines are in a transient speed state, the synchronization of the LP rotors changes to the non-guaranteed activated state. During a transient, each engine is controlled by a setpoint for dN/dt that is integrated from the current rpm of the rotor. Thus, the curved portions 56 and 58 show how the speed N1 of the LP rotor of each engine would have varied without any synchronization: each would have started from its current speed and would have followed a resulting curve obtained by integrating their dN/dt transient setpoints, which are similar. However, both engines are synchronized immediately before passing to the transient speed state. On passing to the transient state, they therefore have practically the same current speed N1 for their LP rotors. Their speeds thus follow two curves 62 and 64 that are substantially identical, derived from two dN/dt setpoints that are likewise close together, even though technically they are not on the same synchronization setpoint. When the conditions A' are once more satisfied, the synchronization passes to the guaranteed activated state and the speeds N1 can adopt the common setpoint for synchronizing the LP rotors, which setpoint is equal to the averages of the setpoints specific to the engines (bold continuous line 60 in FIG. 2).

The activation conditions C are satisfied when the airplane is flying and is neither in a take-off stage nor in a climbing stage. The engine throttle levers are then not beyond the "Max Climb" position.

As shown by arrow 30, these conditions C must necessarily be satisfied in order to activate synchronization, i.e. in order for synchronization to be in ON mode. When these conditions C are not satisfied (or when the conditions "not C" are satisfied), synchronization passes automatically from ON mode (from the guaranteed activated state 16 or from the non-guaranteed activated state 18) to OFF mode (primed state 22). Synchronization therefore does not pass to the deactivated state from which it can be reactivated automatically without the pilot reissuing an order.

A pilot order (N1Sync Pilot Request) is necessary to cause synchronization to pass from the deactivated state 20 to the primed state 22 (arrow 32) by pressing on the corresponding button (N1Sync) in the cockpit.

The airplane cockpit has two synchronization activation buttons, a first button (N1Sync) for activating synchronization of the LP spools of the engines, and a second button (N2Sync) for activating synchronization of the HP spools of the engines. Each of these buttons can adopt one of two positions, respectively ON and OFF. In the ON position, the button is pushed in and lighted, whereas in the OFF position, it projects and the light is off. The pilot cannot request synchronization of both engine spools simultaneously. If the pilot presses on the first button in order to depress it while the second button is already in the depressed position, then the second button disengages automatically in order to return to its extended position.

The pilot order (N1Sync Pilot Request) thus requires pressure to be applied on the button N1Sync in order to depress it and put it in the ON position.

Another pilot order (No N1Sync Pilot Request) is needed to cause synchronization to pass from the primed state 22 to the deactivated state 20 (arrow 34), by pressing once more on the button N1Sync so that it takes up the extended or OFF position.

As explained above, a pilot order (no N1Sync Pilot Request) may be necessary for causing synchronization to pass from the activated state to the deactivated state (arrow 24). This pilot order likewise requires the button N1Sync to be pressed so as to put it in the extended or OFF position.

When the passage of synchronization from the activated state (16 or 18) to the deactivated state 20 results from the fact that the conditions A are not satisfied (arrow 24), synchronization is in the deactivated state while the button N1Sync is still in the depressed or ON position. In order to prime synchronization (arrow 32), the pilot needs to press twice on the button in order firstly to disengage it, and then to reengage it. The logic of the invention needs to detect a rising front in the pilot order so as to cause synchronization to pass to the activated state.

The arrow 36 represents synchronization passing from the primed state 22 to the activated state 16. The conditions A, A', and C must be satisfied in order to activate synchronization. It is also necessary for the button N1Sync to be in the ON or the depressed position, which means that the pilot has already given the order to activate synchronization (N1Sync Pilot Request). These conditions are cumulative and they must therefore all be satisfied in order to activate synchronization.

As a result, no pilot order is needed to confirm and activate synchronization when the button N1Sync is in the ON or depressed position and synchronization has passed to the primed state 22 as a result of the conditions C no longer being satisfied (arrow 30). Nevertheless, as marked on arrow 32, a pilot order is needed to re-prime synchronization that has passed to the deactivated state as a result of the conditions A no longer being satisfied (arrow 24). Reactivation of synchronization is thus automatic under certain circumstances only, thus making it possible to improve the performance of the engines and to provide the engines and the airplane with protection.

Concerning synchronization of the HP spools (activation logic 10' in FIG. 3), the conditions A comprise two activation conditions A1 and A3 and a safety condition A2. The activation conditions A1 and A3 are as follows:

$$|\Delta N1dmd| < 5\%$$

and $$|\Delta N2sel| < 5\%$$

whereby the difference between the setpoint values ("dmd") for the speeds of the LP rotors of the engines (in absolute value) must be less than 5%, and the difference between the measured values ("sel") of the speeds of the HP rotors of the engines (in absolute value) must be less than 5%. $\Delta N1$ represents the difference between the speeds of the LP rotors and $\Delta N2$ represents the difference between the speeds of the HP rotors. In order to synchronize the HP spools, one engine is specified as being a master and the other as being a slave. The slave engine takes as its new HP speed setpoint the measured HP speed of the other engine. There is therefore no need to distinguish between the setpoint "N1dmd_PWM" and the setpoint "N1dmd_ctrl" since the setpoint for the speed N1 is not modified by synchronization.

The additional condition A3 serves to deactivate synchronization if the difference between the two measured speeds N2 is less than 5%. This needs to be verified because of the nature of the type of synchronization in which the setpoint for the slave engine is the measurement of the other engine. This serves firstly to avoid excessive changes in thrust on activating/deactivating synchronization, and above all it serves to avoid the risk of a runaway master engine that has suffered a breakdown or an undetected engine event, thereby contaminating a healthy slave engine.

The activation condition A2 remains the absence of detecting a fault that might damage the engines or that might lead to risks for the engines or the airplane and the passengers.

The conditions A1, A2, and A3 are cumulative and all of them must be satisfied for the conditions A to be considered as being satisfied.

In the same manner as for synchronizing the LP spools of the engines, synchronizing the HP spools passes from the activated state (guaranteed 16 or non-guaranteed 18) to the deactivated state as a function of the results of verifying the conditions A (arrow 24).

As marked on arrows 24, passing from the activated state 16, 18 to the deactivated state 20 may be the result of an order transmitted by the airplane pilot seeking to deactivate synchronization ("No N2Sync Pilot request") with the pilot pressing on the button N2Sync in order to put it into the extended or OFF position.

The activation conditions A' comprise two cumulative activation conditions A'1 and A'2, which are respectively:

$$|N1dmd1-N1sel1|<5\%$$

and $$|N1dmd2-N1sel2|<5\%$$

meaning that the differences between the setpoint value and the measured value for the speed N1 of each of the LP rotors (in absolute value) must be less than 5%.

Figure 4:
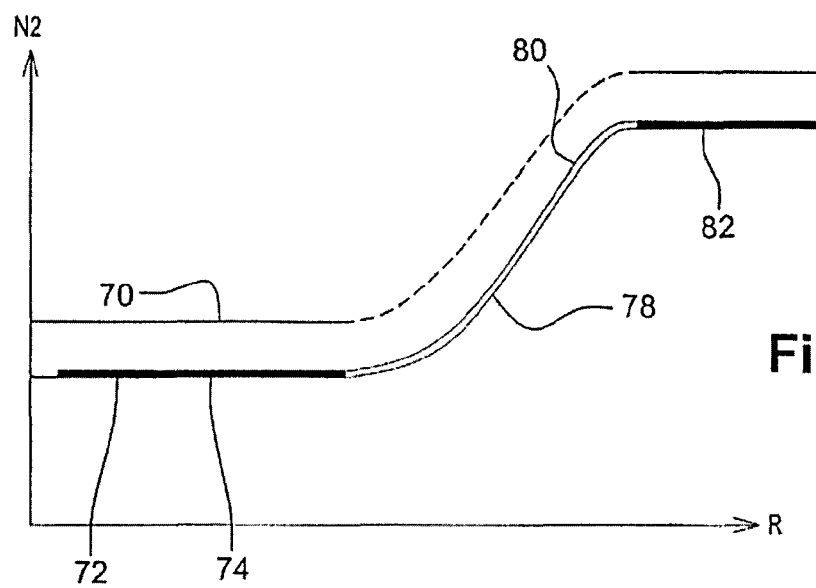
FIG. 4 is a very diagrammatic graph showing how the synchronization setpoints for the HP rotors of the engines of an airplane vary as a function of the speed of the engines.

FIG. 4 shows how the speeds N2 of the HP rotors of the engines of an airplane vary when there is a change in the speed states of the engines.

The curves 70, 72 represent the N2 speed setpoints specific to each engine, each having a first horizontal portion for which the N2 setpoints are constant during a stabilized speed state R1, a sloping portion in which the N2 setpoints increase during a transient speed state R2, and a new horizontal portion during which the N2 setpoints are constant during a stabilized speed state R3.

The positions of these curves 70 and 72 relative to each other serve to identify which engine is to be the master for synchronizing the HP spools. The master engine is the engine having the HP spool rotating at the lower speed N2 in order to deliver a given level of thrust, i.e. the engine corresponding to the curve 72 in FIG. 4.

The setpoint N2 for synchronizing the HP rotors is equal to the setpoint specific to the master engine, i.e. to the setpoint corresponding to the curve 72. This N2 setpoint is shown diagrammatically by the bold continuous line 74 in FIG. 4 that overlies the curve 72 in the above-mentioned horizontal first portion of this curve.

In a transient speed state, the synchronization of the HP rotors passes to the non-guaranteed activated state. As for synchronizing the speeds N1, the speeds N2 of each engine follow paths 78 and 80 that are substantially identical since they are derived from dN/dt setpoints that are close together, with integration taking place from the same initial value. When the speed state is once more stabilized (R3), synchronization has passed to the guaranteed activated state and the speeds N2 adopt the N2 setpoint for synchronizing the HP rotors, which setpoint is equal to the setpoint specific to the master engine (bold continuous line 82 in FIG. 2).

The activation conditions B and C of the activation logic 10' for the HP spools of the engines are identical to those described above when describing the activation logic 10 for the LP spools of the engines.

The invention is applicable to synchronizing two, three, four, or even more engines in a single airplane. When synchronizing the LP spools of two-spool type engines, the N1 setpoints for synchronization may be equal to the average of the N1 setpoints specific to the various engines. When synchronizing the HP spools of the engines, the N2 setpoints for synchronization are preferably the setpoints specific to one of the engines that is considered as being the master engine, the other engines being considered as being slave engines that are required to follow the behavior of the master engine.

In any event, when at least two engines of the airplane are concerned by synchronization, and as mentioned above in the description, it may be desirable to avoid one engine declaring that it is activated on its own, since that can affect the synchronization and possibly also the proper operation of the engines.

Figure 5:
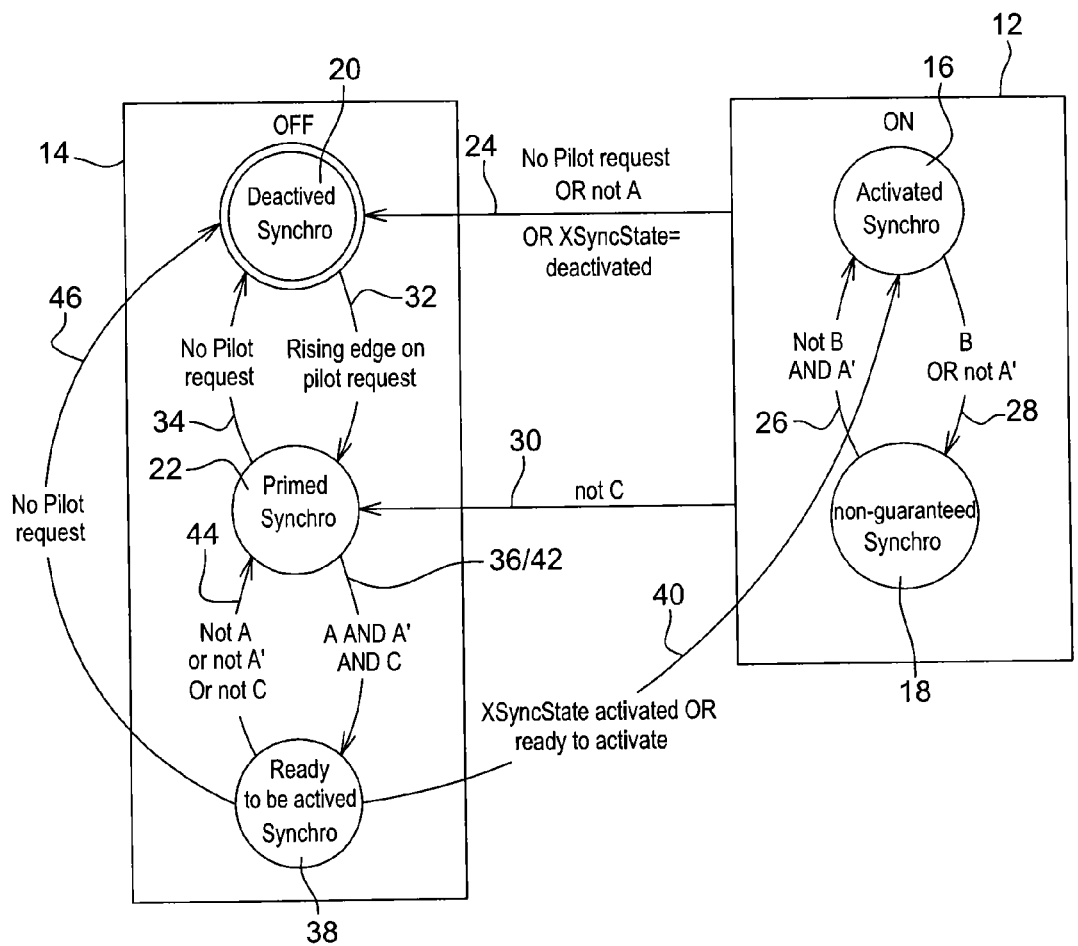
FIG. 5 is a diagram showing activation logic of the invention for synchronizing the rotors of engines of an airplane, making it possible to take account of the synchronization states of the engines relative to one another.

FIG. 5 shows a solution proposed under such circumstances in a situation in which there are two activated states, respectively a guaranteed state 16 and a non-guaranteed state 18, it being specified that a situation with only one activated state (the guaranteed state 16) could equally well exist. Furthermore, the diagram shown is equally suitable for synchronizing the rotors of the high pressure spools or for synchronizing the rotors of the low pressure spools in the engines of the airplane.

As shown, it is therefore proposed, that for each engine, the passage of synchronization from the primed state 22 to the activated state 16 should take place via a transient state 38 referred to as a "ready-to-activate" state, in the sense that:

prior to any passage (arrow 40) of synchronization from this ready-to-activate state 38 to the activated state 16, account is taken for each engine of its activated or ready-to-activate state, and this information is exchanged between the engines; and this passage 40 of synchronization from the ready-to-activate state 38 to the activated state is performed on one of the engines only if the other engine(s) is/are in the ready-to-activate state or in the activated stated (16 or possibly 18).

It is possible to use the ARINC digital connection for exchanging data between the engines about their activated or ready-to-activate states.

Each of the passages 42, 44 of synchronization respectively from the primed state 22 to the ready-to-activate state 38, and vice versa, takes place when certain safety and/or activation conditions are satisfied or not satisfied as the case may be, these conditions preferably being:

the same (e.g. in the meaning respectively A and "NOT A"; conditions A not satisfied);

safety and activation conditions; and cumulative in the first situation and alternative in the second.

If these preferably cumulative conditions are satisfied on the various engines to be synchronized, then they pass automatically together into the activated state 16, thus passing via the ready-to-activate transient state 38, thereby enabling them to enter synchronization simultaneously.

Furthermore, and as shown, if both the guaranteed activated state 16 and the non-guaranteed activated state 18 are in existence, then, in order to ensure that one of the engines is not the only engine in the activated state (whether or not guaranteed) without the other(s) being in the activated state, it is possible in the OFF mode 12 (stop) to make use of this transient state 38 that is distinct from all of the other states such that:

if one of the engines passes to the deactivated state 20, then the other engine or all of the other engines will also pass to that state automatically; and the passage of synchronization of one of the engines to the guaranteed activated state 16 requires that the safety and activation conditions for the other engine, or all of the other engines, are likewise all satisfied.

In this example, in terms of synchronization conditions, no account is taken of whether the synchronization applies to the LP spools or the HP spools.

The conditions 24, 26, 28, 30, 32, and 34 for passing synchronization from one state to another thus remain as shown in FIG. 1 or 3, e.g. with reference to the speeds N1 and/or N2, as shown in FIG. 5.

Nevertheless, for the passage 24, the "Xsync=deactivated" safety condition is added, which corresponds to at least one of the engines losing at least one of its activation conditions, and consequently the information that is exchanged between the engines must cause synchronization to pass to the deactivated state 20.

As shown in FIG. 5, this condition is preferably a condition in the alternative with the above-mentioned "NOT A" condition and the "No Pilot request" condition concerning a control instruction transmitted over the piloting bus by the pilot for the purpose of deactivating synchronization.

As for passages between the primed and ready-to-activate states 22 and 38 respectively, the conditions are preferably safety conditions and activation conditions. Experience shows that it is advantageous to make the passage 42 conditional on cumulative conditions A and A' and C. As an alternative, provision may also be made for the conditions for the passage 42 to be the same as for the passage 36, thus including the additional condition that the pilot has already issued an order to activate synchronization (e.g. button pressed).

The opposite passage 44 from the ready-to-activate state 38 to the primed state 22 preferably takes place for one of the following "opposite" reasons: condition A or A' or C (e.g. button pressed) not satisfied.

Also preferably, the pilot should have the option, e.g. by pressing a button, of transmitting an instruction over the piloting buses to pass from the ready-to-activate transient state 38 to the deactivated state 20 ("No Pilot request" command on line 46).

Concerning the above-mentioned passage 40, it is preferably authorized on the engine in question if the other engine (s) is/are also:
  in the ready-to-activate state (ready-to-activate condition); or
  in the synchronization activated state ("XsyncState activated" condition).

Concerning the passages 26 and 28 that are also mentioned above, the conditions relating to them may be the single condition B (at least one of the engines is idling) being satisfied for the passage 26 and not satisfied ("not B") for the passage 28.

From the above, it is thus possible, e.g. with reference to one of the engines of a twin-engined airplane, to take account of the state of the synchronization function of the other engine in order to make sure that an engine does not declare itself activated on its own, and that if one of the engines is deactivated, then the other is also deactivated. This is made possible by the two engines exchanging information about this state. Without this condition, when both engines are synchronized, and if one engine has a problem but the activation condition is lost before detecting the failure by a usual and periodic test, synchronization will be deactivated only on the engine suffering the failure. The other engine then continues to wait for synchronization. Although this does not raise any problems from a functional point of view, the display available to the pilot will differ depending on the engines.

The invention claimed is:

1. A method of synchronizing engines of an airplane by an electronic chip encoding at least one activation logic for verifying safety and/or activation conditions in order to apply synchronization to the engines, wherein the activation logic defines synchronization states of the engines including at least a deactivated state, a primed state, and an activated state, the method comprising:
  receiving, with the electronic chip, an activation order issued by a pilot of the airplane;
  outputting, with the activation logic encoded on the electronic chip, a command to pass a synchronization state of the engines from the deactivated state to the primed state when the activation order issued by the pilot is received;
  determining, with the activation logic encoded on the electronic chip, whether the safety and/or activation conditions are satisfied or not satisfied, by periodically verifying whether the safety and/or activation conditions meet predetermined thresholds or predetermined operation states of the engines or of the airplane;
  outputting, with the activation logic encoded on the electronic chip, a command to pass the synchronization state of the engines from the primed state to the activated state when certain of the safety and/or activation conditions are satisfied;
  receiving, with the electronic chip, a deactivation order issued by the pilot, or determining that certain of the safety conditions are not satisfied; and
  outputting, with the activation logic encoded on the electronic chip, a command to pass the synchronization state of the engines from the activated state or the primed state to the deactivated state when the deactivation order issued by the pilot is received or whenever it is determined that the certain of said safety conditions are not satisfied.

2. A method according to claim 1, wherein:
  the safety and/or activation conditions for application to synchronization comprise safety conditions for activating synchronization and synchronization activation conditions that are different from safety conditions; and
  the activation logic includes passing synchronization from the activated state to the primed state whenever certain activation conditions are not satisfied.

3. A method according to claim 1, wherein the conditions for activating synchronization to the activated state differ as a function of the initially deactivated or primed state of the synchronization.

4. A method according to claim 1, wherein the activation logic defines two distinct activated states, comprising a guaranteed activated state in which all of the activation conditions are satisfied and a non-guaranteed activated state in which only some of said activation conditions are satisfied.

5. A method according to claim 1, wherein:
  the activation logic defines two distinct activated states, comprising a guaranteed activated state in which all of the activation conditions are satisfied and a non-guaranteed activated state in which only some of said activation conditions are satisfied, and
  the activation logic includes passing synchronization from the primed state to the non-guaranteed activated state when only a predefined portion of the activation conditions are satisfied, and to the guaranteed activated state when all of the activation conditions are satisfied.

6. A method according to claim 1, wherein:
  the activation logic defines two distinct activated states, comprising a guaranteed activated state in which all of the activation conditions are satisfied and a non-guaranteed activated state in which only some of said activation conditions are satisfied, and
  synchronization passes from the non-guaranteed activated state to the guaranteed activated state, and/or vice versa, as a function of changes occurring in the results of said periodic verifying of activation conditions.

7. A method according to claim 1, wherein:
for each engine:
the passing of synchronization from the primed state to the activated state is performed by means of a transient ready-to-activate state;
synchronization is passed from the activated state to the ready-to-activate state when certain safety and/or activation conditions are satisfied;
before any passing of synchronization from the ready-to-activate state to the activated state, account is taken for each engine of the activated or ready-to-activate state and this data is exchanged between the engines; and
synchronization is passed from the ready-to-activate state to the activated state on one of the engines, when the other engine or engines is, or are, in the ready-to-activate state or in the activated state.

8. A method according to claim 4, wherein the activation logic defines an additional state which is a ready-to-activate state that is transient, and distinct from said deactivated, primed, non-guaranteed activated, and guaranteed activated states respectively, said ready-to-activate state taking account of the state of one of the engines relative to the other(s) depending on whether or it is in the guaranteed activated state, such that:
when one of the engines passes to the activated state, the other engine(s) also pass(es) to the activated state automatically; and
passing the synchronization of one of the engines to the guaranteed activated state requires all of the safety and activation conditions of the other engine(s) to be satisfied.

9. A method according to claim 1, wherein the engines are two-spool engines, each having a LP, low pressure, spool and a HP, high pressure, spool, and synchronization of the LP spools of the engines is activated in accordance with a first activation logic and synchronization of the HP spools of the engines is activated in accordance with a second activation logic, in such a manner that the conditions for synchronizing the LP spools are different from the conditions for synchronizing the HP spools.

10. A method according to claim 9, wherein the conditions for synchronizing the LP spools comprise, at least: a safety condition for activating synchronization and a synchronization activation condition and the synchronization conditions for the HP spools comprise, at least: a safety condition for activating synchronization and a plurality of cumulative synchronization activation conditions .

11. A method according to claim 9, wherein the conditions for synchronizing the LP spools are different from the conditions for synchronizing the HP spools.

12. A method according to claim 9, wherein the conditions for synchronizing the LP and/or HP spools comprise one or more of the following conditions:
the difference between the setpoints for the speeds of the LP or HP rotors of the engines is less than 5%;
no fault has been detected that might affect the health of the engines or that might generate risks for the airplane;
the difference between the measured speeds of the LP or HP rotors of the engines is less than 5%;
the difference between the speed setpoint and the measured speed for each LP or HP rotor is less than 5%;
at least one of the engines is idling; and
the airplane is in flight and is neither in a takeoff stage nor in a climbing stage.

13. A method according to claim 12, wherein the synchronization passes from the activated state to the deactivated state when at least one of the conditions:
the difference between the setpoints for the speeds of the LP or HP rotors of the engines is less than 5%,
no fault has been detected that might affect the health of the engines or that might generate risks for the airplane, and
the difference between the measured speeds of the LP or HP rotors of the engines is less than 5%, is not satisfied.

14. A method according to claim 12, wherein the synchronization passes from the activated state to the primed state when the condition that the airplane is in flight and is neither in the takeoff stage nor in the climbing stage is not satisfied.

15. A method of synchronizing engines of an airplane by an electronic chip encoding at least one activation logic for verifying safety and/or activation conditions in order to apply synchronization to the engines, wherein the activation logic defines synchronization states of the engines including at least a deactivated state, a primed state, and an activated state, the method comprising:
receiving, with the electronic chip, an activation order issued by a pilot of the airplane;
outputting, with the activation logic encoded on the electronic chip, a command to pass a synchronization state of the engines from the deactivated state to the primed state when the activation order issued by the pilot is received;
determining, with the activation logic encoded on the electronic chip, whether the safety and/or activation conditions are satisfied or not satisfied, by periodically verifying whether the safety and/or activation conditions meet predetermined thresholds or predetermined operation states of the engines or of the airplane;
outputting, with the activation logic encoded on the electronic chip, a command to pass the synchronization state of the engines from the primed state to the activated state when certain of the safety and/or activation conditions are satisfied;
receiving, with the electronic chip, a deactivation order issued by the pilot, or determining that certain of the safety conditions are not satisfied; and
outputting, with the activation logic encoded on the electronic chip, a command to pass the synchronization state of the engines from the activated state or the primed state to the deactivated state when the deactivation order by the pilot is received or whenever it is determined that the certain of said safety conditions are not satisfied; and
wherein:
for each engine:
the passing of synchronization from the primed state to the activated state is performed by a transient ready-to-activate state;
synchronization is passed from the activated state to the ready-to-activate state when certain of the safety and/or activation conditions are satisfied;
before any passing of synchronization from the ready-to-activate state to the activated state:
account is taken for each engine of the activated or ready-to-activate state, and
state data is exchanged between the engines; and
synchronization is passed from the ready-to-activate state to the activated state on one of the engines, when the other engine or engines is, or are, in the ready-to-activate state or in the activated state.

16. A method of synchronizing at least first and second engines of an airplane, by an electronic chip including at least one activation logic circuit, for sensing and checking safety and activation conditions in order to apply synchronization to the first and second engines, wherein the at least one activation logic circuit defines synchronization states of the first and second engines including at least a deactivated state, a primed state, and an activated state, the method comprising:

sensing from the first and second engines the safety and activation conditions including a speed of each of the first and second engines, receiving, with the electronic chip, an order issued from a pilot through at least one synchronization activation press button, checking, with the at least one activation logic circuit, which synchronization state of the first and second engines among the deactivated state, the primed state, and the activated state is set, outputting, with the at least one activation logic circuit, a command to pass the synchronization state from the deactivated state to the primed state when an activation order issued from the pilot via said at least one synchronization activation press button is received;

determining, with the at least one activation logic circuit, whether the safety and activation conditions are satisfied or not satisfied, by periodically verifying whether the safety and activation conditions meet predetermined thresholds or predetermined operation states of the engines or of the airplane;

outputting, with the at least one activation logic circuit, a command to pass the synchronization state from the primed state to the activated state when at least some of the safety and activation conditions are satisfied; and outputting, with the at least one activation logic circuit, a command to pass the synchronization state from the activated state or the primed state to the deactivated state when a deactivation order issued from the pilot via said at least one synchronization activation press button is received or whenever certain of the safety conditions are not satisfied.

* * * * *